United States Patent [19]

Ashmun et al.

[11] 4,191,356

[45] Mar. 4, 1980

[54] ENGINE MOUNTING BASE

[75] Inventors: Raymond V. Ashmun, Peoria; Steven R. Baker, Magnolia; Jerry A. Damerell, Washburn, all of Ill.

[73] Assignee: Caterpillar Tractor Co., Peoria, Ill.

[21] Appl. No.: 913,931

[22] Filed: Jun. 8, 1978

[51] Int. Cl.[2] .............................................. F16F 15/00

[52] U.S. Cl. ................................... 248/678; 290/1 A; 290/52; 184/6

[58] Field of Search ........................ 290/52, 1 A, 1 R; 184/6 R, 6.3, 6.11, 6.28; 60/39.08; 248/678, 679

[56] References Cited

U.S. PATENT DOCUMENTS

| | | | |
|---|---|---|---|
| 975,167 | 11/1910 | Shultz | 248/678 X |
| 1,716,132 | 6/1929 | Hodgkinson | 248/678 X |
| 2,568,783 | 9/1951 | Woodruff | 248/678 X |
| 2,609,891 | 9/1952 | Haas | 184/6 R |
| 2,632,529 | 3/1953 | Kennedy | 184/6.3 |
| 2,963,032 | 12/1960 | Kenney | 184/6 X |
| 3,330,514 | 7/1967 | Williams | 248/678 |
| 3,418,485 | 12/1968 | Anderson et al. | 290/52 X |
| 3,485,324 | 12/1969 | Novak | 184/6 R |
| 3,623,573 | 11/1971 | Csanady et al. | 184/6 R |
| 3,910,381 | 10/1975 | Csanady et al. | 290/52 X |

*Primary Examiner*—David H. Brown
*Attorney, Agent, or Firm*—Charles E. Lanchantin, Jr.

[57] ABSTRACT

An engine mounting base (8) has a first hollow frame portion (34) containing fluid at generally atmospheric pressure, and a second hollow frame portion (36) containing fluid at a preselected pressure above atmospheric pressure. Preferably, the mounting base (8) includes a plurality of elongate tubes (46,48,50,52,56,60,62,64,76) having closed ends and connected together at various elevations to provide a plurality of chambers (54,58,66,77) useful for fluid distribution and collection purposes.

18 Claims, 2 Drawing Figures

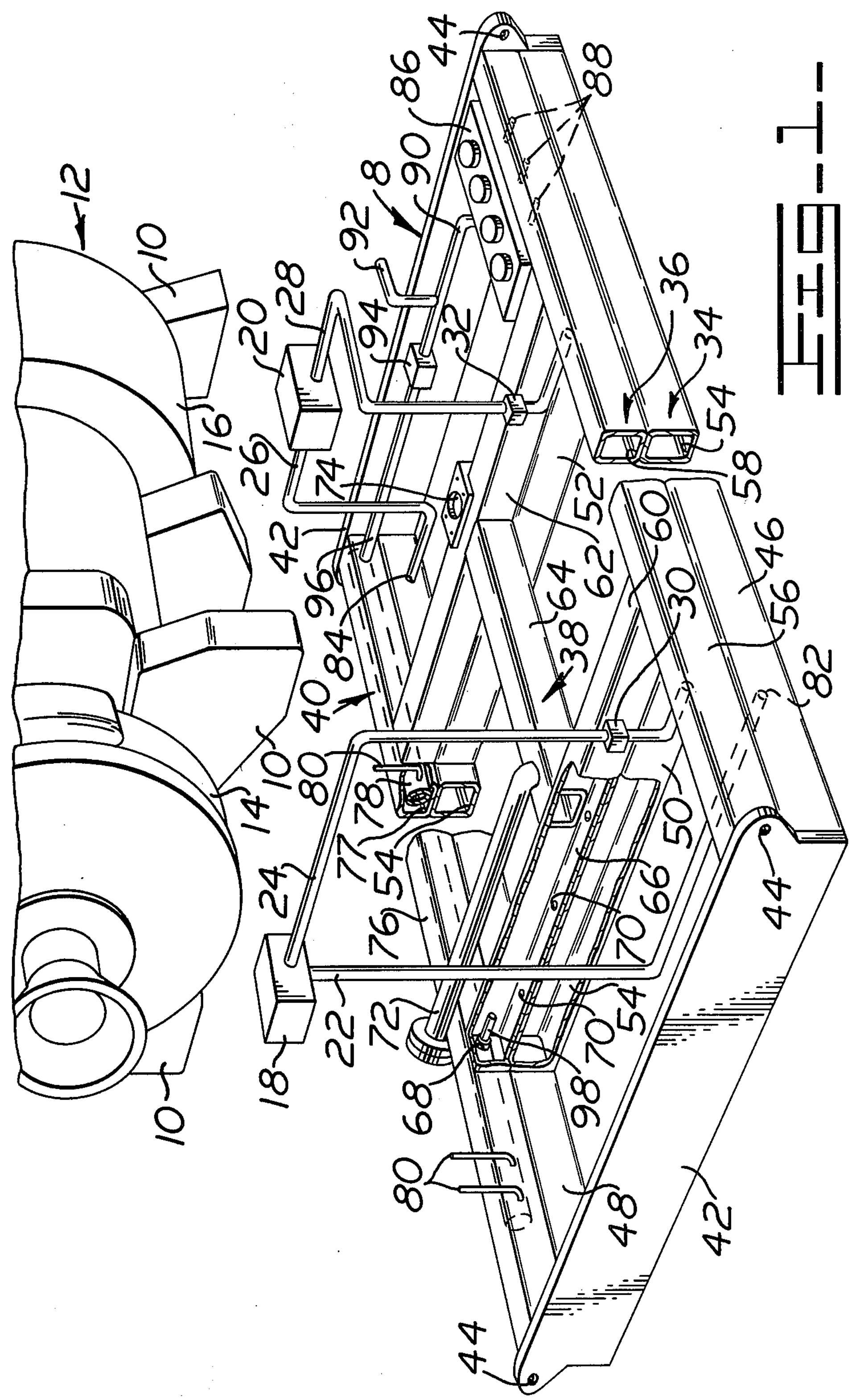
12
10
16
20
28
92
8
90
86
44
88
26
94
32
74
42
96
84
40
80
10
14
78
77
54
24
76
22
72
68
98
70
66
50
30
38
64
62
52
60
58
54
34
36
46
56
82
44
48
42
80
44
18
10

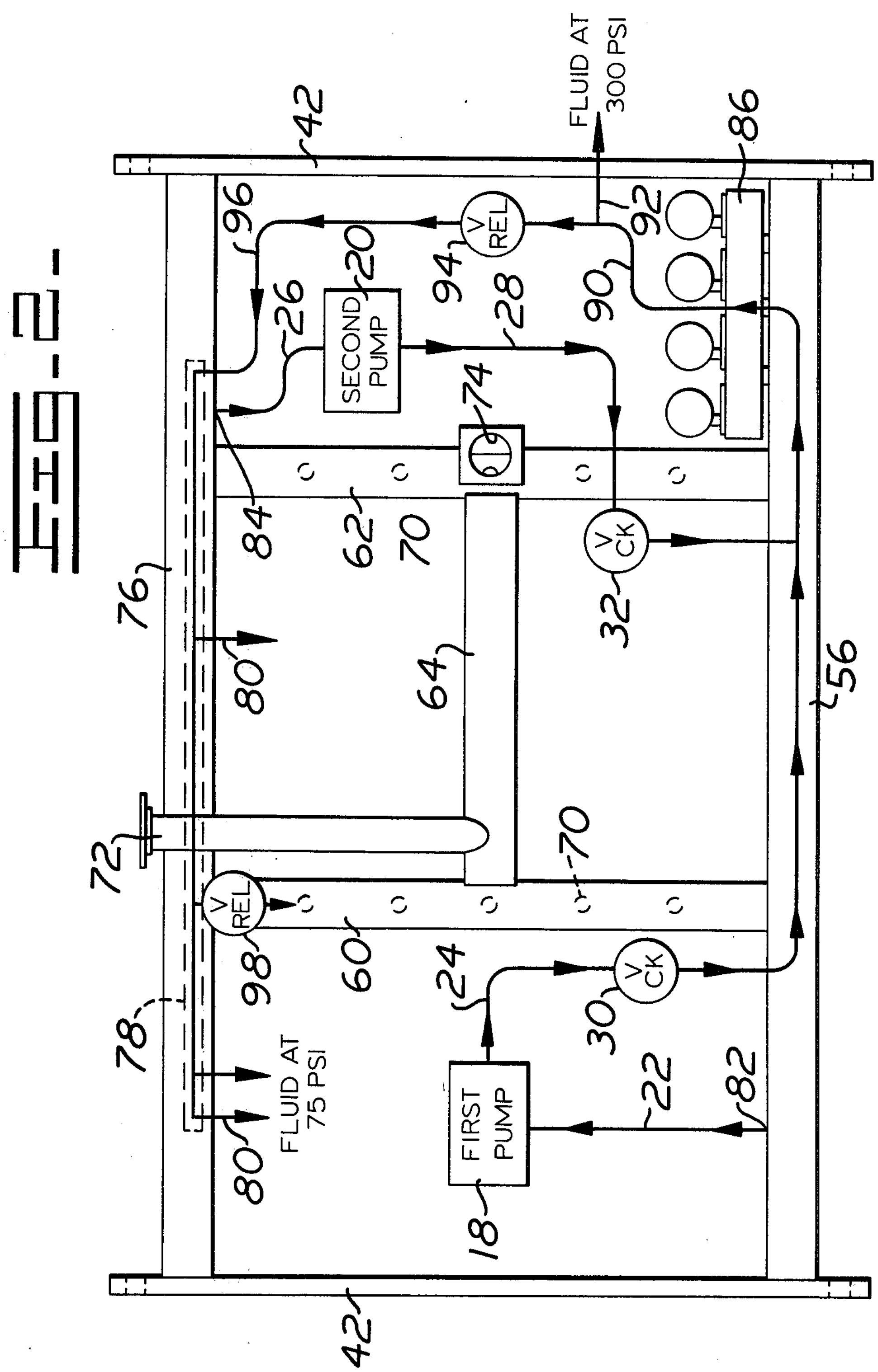
FLUID AT
300 PSI
SECOND
PUMP
FIRST
PUMP
V
REL
V
CK
FLUID AT
75 PSI
42
86
96
20
92
94
26
28
90
74
84
62
70
32
76
80
64
56
72
70
98
60
24
30
78
22
82
18
42

ENGINE MOUNTING BASE

TECHNICAL FIELD

The present invention is related to an engine mounting base and a portion of a fluid distribution system for the engine utilizing the mounting base.

Integrated enclosures and rigid mounting arrangements for engines are known which allow convenient transport thereof as a self-contained power plant package. The rigid base therefore eliminates the need for attachment of the engine to an auxiliary mounting base prepared for it at the installation site and generally greatly simplifies the installation procedure. For example, reference is made to U.S. Pat. No. 3,418,485 issued Dec. 24, 1968 to H. R. Anderson et al., assigned to the assignee of the instant application, showing an enclosure for a gas turbine engine and associated electric generator set. That reference discloses a rigid base that not only supports the engine, but also defines a sump or reservoir for the lubricating oil of the engine. Self-contained power plant packages of the aforementioned type are therefore very desirable for roof-top installation, emergency use in the field, and the like.

Heretofore, relatively complex and fabricated sheet metal reservoirs have been utilized on these self-contained power plants. Moreover, separate fluid control systems have been incorporated on the engine to permit a sufficient quantity of lubricating fluid to be delivered to the engine bearings and to other components at the desired pressure. While such systems have performed adequately, they have been relatively costly in construction and have not been as effective as desired.

The present invention is directed to overcoming one or more of the problems as set forth above.

DISCLOSURE OF INVENTION

In accordance with one aspect of the present invention, an engine mounting base is provided having a first hollow frame portion containing a fluid at generally atmospheric pressure, and a second hollow frame portion containing fluid at a preselected pressure level above atmospheric pressure, and with the frame portions being connected together.

In another aspect of the invention, the hollow frame portions of the instant engine mounting base are made from structural strength tubing having closed ends. The tubes are preferably connected together, interconnected in a preselected manner to provide common chambers, and arranged at different elevations so as to provide an effective portion of a fluid distribution system as well as a simple and yet rigid engine mounting base.

BRIEF DESCRIPTION OF DRAWINGS

FIG. 1 is a diagrammatic, perspective view of an engine mounting base constructed in accordance with one embodiment of the present invention, with portions broken open to better illustrate details thereof, and showing a fragmentary portion of an associated engine elevated above its mounted position on the mounting base for clarity.

FIG. 2 is a diagrammatic, plan view of the engine mounting base illustrated in FIG. 1 showing the various fluid chambers and fluid flow paths providing a portion of an engine fluid distribution system.

BEST MODE FOR CARRYING OUT THE INVENTION

Referring to FIG. 1, one embodiment of an engine mounting base or engine support apparatus 8 is shown for supporting a plurality of support feet 10 of a dual shaft gas turbine engine 12. Hence, the gas turbine engine has a gasifier turbine portion 14 and a power turbine portion 16 which operate at different rotational speeds, and these separate portions respectively drive first and second engine driven pumps 18 and 20 as is known in the art. Moreover, while the first pump has fluid inlet and outlet passages 22,24 and the second pump has corresponding fluid inlet and outlet passages 26,28, first and second one-way check valves 30,32 are provided individually on the respective outlet passages 24,28 for purposes which will be later explained.

Basically, however, the engine mounting base 8 includes a first hollow frame means or reservoir portion 34, a second hollow frame means or high pressure portion 36, a third hollow frame means or fluid collecting portion 38, and a fourth hollow frame means or intermediate pressure portion 40. A pair of substantially parallel, tube-closing end plates 42 provide additional strength for the mounting base, and a lifting eye 44 is defined at each end of the plates for lifting or skidding the mounting base 8 and engine 12 as a self-contained unit during initial installation thereof.

More particularly, the reservoir portion 34 of the instant example includes a substantially parallel pair of longitudinally oriented elongate tubes 46,48, and a pair of substantially parallel elongate cross tubes 50, 52 extending transversely between the tubes 46,48. These tubes and the closing end plates 42 define a common reservoir chamber 54 containing a preselected quantity of fluid such as lubricating oil at generally atmospheric pressure.

The high pressure portion 36 includes a longitudinally oriented elongate tube 56 having opposite ends closed off by the end plates 42 and defining a high pressure chamber 58 therein. The tubes 46,56 are preferably substantially rectangular in cross section as shown by the broken open portion in FIG. 1. This permits the tubes to be elevationally stacked on top of one another for increased beam depth and strength. Specifically, for example, the tube 56 is disposed on top of the tube 46.

In a similar manner, the fluid collecting portion 38 includes a substantially parallel pair of elongate cross tubes 60,62 and a longitudinally oriented tube 64 connected therebetween and defining a generally H-shaped collecting chamber 66. The ends of the cross tubes 60,62 are closed or blocked, except for an opening 68. Moreover, a plurality of flow-restricting openings 70 of preselected cross sectional area are defined between the collecting chamber 66 and the reservoir chamber 54, both at the juxtaposed surfaces of the elevationally aligned cross tubes 50,60 as representatively illustrated, and also at the cross tubes 52,62. A breather pipe 72 extends upwardly from the top of the tube 64 and to the side of the mounting base 8 where it is subsequently connected to an upright vent pipe, not shown, at the installation site. A main fluid return or drain opening 74 is also provided through the top of the cross tube 62, and this drain opening communicates with the bottom of the gas turbine engine 12.

In the embodiment illustrated, the intermediate pressure portion 49 includes a longitudinally oriented elongate tube 76 located immediately above the tube 48, and connected thereto and to the cross tubes 60,62. Since the ends of the tube 76 are blocked by the end plates 42, a chamber 77 is defined therein that could serve as an intermediate pressure manifold. However, because the chamber 77 is difficult to clean during initial assembly of the mounting base 8, an intermediate pressure distribution manifold 78 is connected inside the tube 76 for this purpose. A plurality of conduits 80 are connected to the manifold 78 and extend outwardly of the tube 76 to distribute fluid as needed to the gas turbine engine 12.

It is of note to observe from FIG. 1 that the inlet passage 22 of the first pump 18 is connected to the tube 46 as at an opening 82, and that the inlet passage 26 of the second pump 20 is connected to the tube 48 as at an opening 84 at the opposite sides of the reservoir portion 34. This assures more uniform withdrawal of fluid from the opposite extremities of the reservoir portion and improves reliability should the mounting base 8 be tipped in use.

A fluid filter assembly 86 is connected to the inside faces of the tubes 46,56 and is in fluid communication with the high pressure chamber 58 as by one or more passages 88. An outlet conduit or passage 90 from the filter assembly is in fluid communication with a branch conduit 92 leading to the engine 12. A conventional relief valve 94, set for example at about 300 psi (2,070 KPa), is in series relation with conduit 90 so that relatively high pressure fluid at such pressure is present in the chamber 58 and in the branch conduit 92. Fluid relieved past the relief valve communicates through a conduit 96 to the distribution manifold 78 located within the tube 76. Another conventional relief valve 98 extends through the opening 68 and is in communication with fluid within the manifold 78. This second relief valve 98, set for example at about 75 psi (520 KPa), establishes the pressure in the manifold and the plurality of conduits 80 leading therefrom and to the engine 12. Fluid relieved past the second relief valve is communicated to the cross tube 60 and to the fluid collecting portion 38.

INDUSTRIAL APPLICABILITY

In operation, as the gas turbine engine 12 is started, the first and second pumps are driven at different rates of speed corresponding to the rotational speeds of the gasifier turbine portion 14 and power turbine portion 16, respectively. Consequently, the check valves 30,32 are provided in the outlet or discharge passages 24,28 thereof to prevent either pump having to start up under a higher fluid back pressure established by the other pump.

Under normal operating circumstances, the reservoir chamber 54 of the mounting base 8 is substantially completely filled with lubricating fluid at generally atmospheric pressure, and the pumps 18,20 have approximately the same fluid pumping capacities to enable fluid to be drawn from the opposite sides of the reservoir portion 34 at about the same rate as is illustrated in both FIGS. 1 and 2. Thence, the fluid is delivered to the high pressure chamber 58 so that it is also substantially completely filled. The fluid is subsequently filtered by the filter assembly 86 and delivered to the branch conduit 92 to the gas turbine engine 12. Accordingly, high pressure fluid is available thereat for a multiplicity of operating purposes. Fluid not needed by the engine via the conduit 92 is directed through the relief valve 94 to the conduit 96 and to the distribution manifold 78 as shown by the flow indicating arrows on the drawings. Therefore, fluid under an intermediate pressure is available thereat for various operating needs, and a plurality of conduits 80 serve to communicate such fluid to parts of the gas turbine engine 12 as necessary.

Fluid not needed by the distribution manifold 78 is directed through the second relief valve 98 into the collecting portion 38 at a preselected flow rate. Specifically, such rate is about the same flow rate as that returning from the gas turbine engine 12 via the main drain opening 74. Significantly then, equivalent amounts of fluid are returned to the collecting portion at the opposite cross tubes 60,62, with the plurality of sized openings 70 serving to uniformly distribute the gravity flow of fluid from the upper collecting portion to the lower reservoir portion 34. These flow distributing features of the mounting base 8 are particularly useful, for example, when the self-contained package is tipped in use such as is typically the case in a marine gear application. This is also why the breather pipe 72 is connected to the reservoir portion substantially centrally of the mounting base.

Thus it is apparent that the subject mounting base 8 is economical and strong in its construction, such as by consisting primarily of a plurality of close-ended tubes welded or otherwise connected together, for example, structural strength tubes of steel. Advantageously, the tubes are interconnected at various elevations to provide several fluid chambers containing preselected quantities of fluid and individually established at atmospheric pressure and at different pressure levels above atmospheric pressure, so that a portion of an engine fluid distribution system is provided by the mounting base in addition to supporting the engine. The pumps 18,20 draw fluid from the lower level reservoir portion 34 and deliver the fluid to the upper level high pressure and intermediate pressure portions 36,40, with the return of fluid from the engine 12 being accommodated by gravity flow through the upper collecting portion 38 back to the reservoir portion.

Other aspects, objects, and advantages of this invention can be obtained from a study of the drawings, the disclosure, and the appended claims.

What is claimed is:

1. An engine mounting base (8) comprising:

first hollow frame means (34) for containing a preselected quantity of a fluid at generally atmospheric pressure;

second hollow frame means (36) for containing another preselected quantity of said fluid at a preselected pressure level above atmospheric pressure, said first and second hollow frame means (34,36) being connected; and means (40) for containing another preselected quantity of said fluid at an intermediate pressure between atmospheric pressure and said preselected pressure in said second hollow frame means (36).

2. An engine mounting base (8) comprising:

first hollow frame means (34) for containing a preselected quantity of a fluid at generally atmospheric pressure;

second hollow frame means (36) for containing another preselected quantity of said fluid at a preselected pressure level above atmospheric pressure, said second hollow frame means (36) being connected to and at an elevation greater than said first hollow frame means (34);

pump means (18,20) for communicating said fluid from said first hollow frame means (34) to said second hollow frame means (36); and means (40) for containing another preselected quantity of said fluid at an intermediate pressure between atmospheric pressure and said preselected pressure in said second hollow frame means (36).

3. The engine mounting base (8) of claim 2 including first and second pressure relief valve means (94,98) for establishing said preselected pressure and said intermediate pressure.

4. The engine mounting base (8) of claim 3 including third hollow frame means (38) for receiving fluid from said second valve means (98).

5. An engine mounting base (8) comprising:

first hollow frame means (34) for containing a preselected quantity of a fluid at generally atmospheric pressure, said first hollow frame means (34) including first and second substantially parallel elongate tubes (46,48) having closed ends and a third tube (50) connected to said pair of tubes (46,48) and defining a common fluid chamber (54) therewith; and second hollow frame means (36) for containing another preselected quantity of said fluid at a preselected pressure level above atmospheric pressure, said first and second hollow frame means (34,36) being connected.

6. The engine mounting base (8) of claim 5 wherein said second hollow frame means (36) includes a fourth elongate tube (56) having closed ends connected elevationally above and to one of said first and second tubes (46,48).

7. The engine mounting base (8) of claim 6 including an engine driven pump (18) and passage means (22,24) for connecting said pump (18) to said first hollow frame means (34) and to said fourth tube (56).

8. The engine mounting base (8) of claim 6 including a fifth elongate tube (76) having closed ends connected elevationally above and to the other one of said first and second (46,48) tubes, and including a fluid distribution manifold (78) connected within said fifth tube (76).

9. The engine mounting base (8) of claim 8 including a sixth tube (60) connected elevationally above and to said third tube (50), and a plurality of openings (70) between said third and sixth tubes (50,60) allowing controlled flow of said fluid therebetween.

10. In an engine mounting base (8) of the type for supporting an engine (12) having a pump (18) and fluid inlet and outlet passages (22,24) communicating with said pump (18), the improvement comprising:

a plurality of elongate tubes (46,48,50,52) of rectangular cross sectional configuration interconnected generally at a first elevation and defining a first chamber (54); and another elongate tube (56) of rectangular cross sectional configuration connected at an elevation above and directly to one of said plurality of elongate tubes (46,48,50,52) and defining a second chamber (58), said inlet and outlet passages (22,24) of said pump (18) being in fluid communication with said first and second chambers (54,58), respectively.

11. The engine mounting base (8) of claim 10 including a second plurality of elongate tubes (62,64,66) of rectangular cross sectional configuration connected directly to and at a greater elevation than said plurality of elongate tubes (46,48,50,52), said second plurality of elongate tubes (62,64,66) defining a third chamber (66).

12. An engine mounting apparatus (8) for supporting an engine (12), comprising:

a first elongate tube (46) defining a fluid reservoir chamber (54);

a second elongate tube (56) defining a pressure chamber (58), the first and second elongate tubes (46,56) being connected and rectangular in cross sectional configuration; and means (18,22,24,94) for communicating fluid from said fluid reservoir chamber (54) at generally atmospheric pressure to said pressure chamber (58) and maintaining a preselected quantity of said fluid at a preselected pressure level above atmospheric pressure thereat.

13. The engine mounting apparatus (8) of claim 12 including conduit means (90,92) for communicating the fluid from said pressure chamber (58) to said engine (12), and a third elongate tube (62) of rectangular cross sectional configuration of a construction sufficient for receiving return fluid from said engine (12).

14. The engine mounting apparatus (8) of claim 12 wherein said second elongate tube (56) is connected elevationally above and to said first elongate tube (46).

15. The engine mounting apparatus (8) of claim 12 including an intermediate pressure distribution manifold (78), a conduit (90,96) communicating said fluid between said pressure chamber (58) and said manifold (78), and a relief valve (94) connected in series with said conduit (90,96).

16. The engine mounting apparatus (8) of claim 15 including a collecting tube (60) and a second relief valve (98) connected between said manifold (78) and said collecting tube (60) and having a pressure relief setting less than said relief valve (94).

17. An engine mounting base (8) for supporting an engine (12), comprising:

first, second and third tubes (46,48,52) connected together and collectively defining a first chamber (54);

a fourth tube (56) defining a second chamber (58) and being connected elevationally above and to said first tube (46); and a fifth tube (62) defining a third chamber (66) and being connected elevationally above and to said third tube (52), each of said tubes (46,48,52,56,62) having a rectangular cross section and being of sufficient strength to provide support for said engine (12).

18. The engine mounting base (8) of claim 17 wherein said first and second tubes (46,48) are parallel and spaced apart and said third tube (52) extends transversely therebetween.

* * * * *